United States Patent [19]
Nagano

[11] Patent Number: 5,413,534
[45] Date of Patent: May 9, 1995

[54] CHAIN SHIFT AIDING STRUCTURE FOR BICYCLE SPROCKET

[75] Inventor: Masashi Nagano, Izumi, Japan

[73] Assignee: Shimano Inc., Japan

[21] Appl. No.: 165,537

[22] Filed: Dec. 13, 1993

Related U.S. Application Data

[63] Continuation of Ser. No. 964,523, Oct. 19, 1992, abandoned.

[30] Foreign Application Priority Data

Oct. 21, 1991 [JP] Japan .................................. 3-272170

[51] Int. Cl.⁶ .............................................. F16H 9/10
[52] U.S. Cl. ...................... 474/78; 474/160; 474/164
[58] Field of Search .................. 474/78, 80, 158, 160, 474/162, 164

[56] References Cited

U.S. PATENT DOCUMENTS

| | | | |
|---|---|---|---|
| 4,198,876 | 4/1980 | Nagano | 74/243 R |
| 4,598,608 | 7/1986 | Ueno | 474/160 X |
| 5,066,264 | 11/1991 | Romano | 474/152 |
| 5,078,653 | 1/1992 | Nagano | 474/78 |
| 5,085,621 | 2/1992 | Nagano | 474/160 |
| 5,087,226 | 2/1992 | Nagano | 474/160 |
| 5,188,569 | 2/1993 | Kobayashi | 474/160 |
| 5,192,248 | 3/1993 | Nagano | 474/160 X |

FOREIGN PATENT DOCUMENTS

| | | |
|---|---|---|
| 008851 | 3/1980 | European Pat. Off. . |
| 021839 | 1/1981 | European Pat. Off. . |
| 144984 | 6/1986 | European Pat. Off. . |
| 313345 | 4/1989 | European Pat. Off. . |
| 396091 | 11/1990 | European Pat. Off. . |
| 63-2392 | 1/1988 | Japan . |
| 2005363 | 4/1978 | United Kingdom . |

*Primary Examiner*—Roger J. Schoeppel
*Attorney, Agent, or Firm*—Dickstein, Shapiro & Morin

[57] ABSTRACT

A sprocket assembly for a bicycle having a large sprocket and a small sprocket. The large sprocket includes chain support projections formed on the side surface opposed to the small sprocket. Each projection includes a contact portion defining a contact surface for contacting, without meshing, a lower end of a chain shifted from the small sprocket to the large sprocket. The chain support means are arranged for causing the contact surface to contact the chain engaging the small sprocket and pick up the chain radially outwardly of the large sprocket during a chain shift from the small sprocket to the large sprocket.

12 Claims, 13 Drawing Sheets

FIG.12(a)
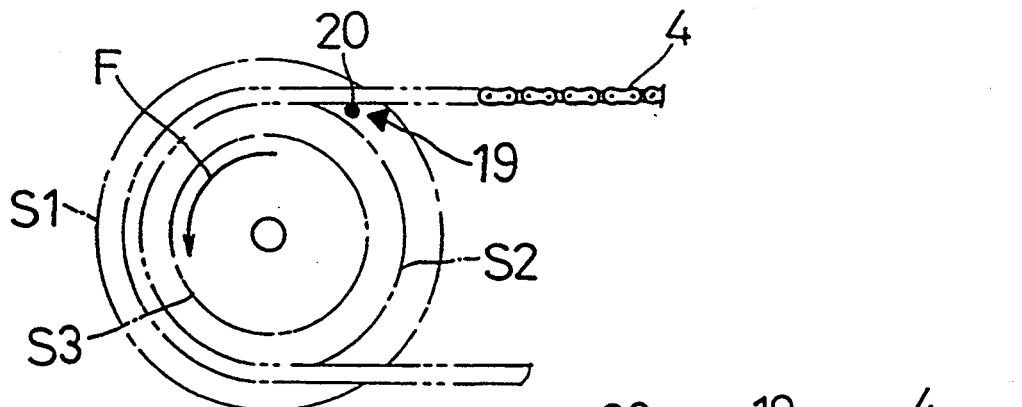
FIG.12(b)
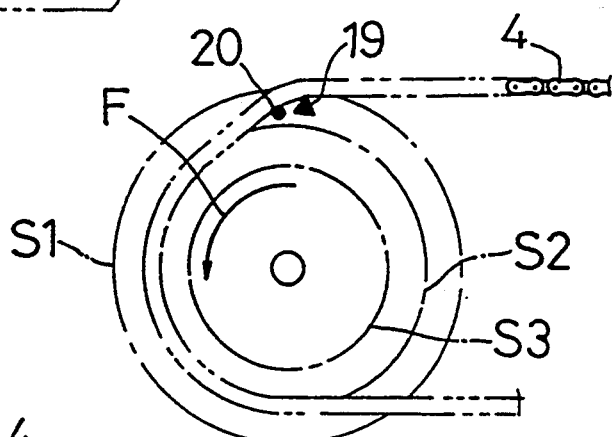
FIG.12(c)
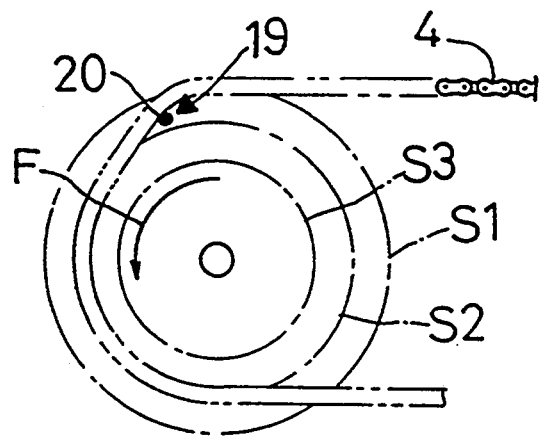
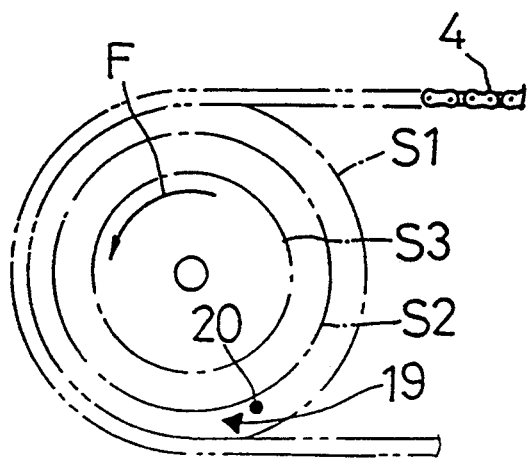
FIG.12(d)

CHAIN SHIFT AIDING STRUCTURE FOR BICYCLE SPROCKET

This application is a continuation of application Ser. No. 07/964,523 filed Oct. 19, 1992, now abandoned.

BACKGROUND OF THE INVENTION

1. Field of the Invention

The present invention relates to a structure formed on a sprocket to aid in shifting of a bicycle chain.

2. Description of the Related Art

In a multi-stage sprocket assembly of a bicycle having a derailleur, a chain is movable by a shifting force of the derailleur from a small sprocket to a large sprocket. In a conventional sprocket assembly, a side surface of the chain contacts a side surface of the large sprocket, and the chain is supported by the large sprocket through a frictional force produced by the contact. With rotation of the large sprocket, the chain is raised radially outwardly of this sprocket to engage teeth of the sprocket.

However, shifting of the chain in this manner requires a sufficient frictional force produced between the chain and the large sprocket to pick up the chain reliably with rotation of the sprocket. In other words, the derailleur must exert a strong force to press the chain upon the large sprocket.

When a heavy drive load occurs during a shifting operation, the chain may slip from the large sprocket. This makes it very difficult to pick up the chain with the large sprocket, or results in a delay of chain shift.

SUMMARY OF THE INVENTION

An object of the present invention is to provide a sprocket structure for shifting a chain from a small sprocket to a large sprocket relatively easily, and that reliably even under a heavy drive load.

The above object is fulfilled, according to the present invention, by a sprocket assembly for a bicycle comprising a large sprocket, a small sprocket, and chain support projections projecting from a side surface of the large sprocket toward the small sprocket, each projection including a contact portion defining a contact surface for contacting, without meshing, a lower surface of a chain shifted from the small sprocket to the large sprocket, wherein the chain support projections are disposed for causing the contact surface to contact the chain engaging the small sprocket and pick up the chain radially outwardly of the large sprocket during a chain shift from the small sprocket to the large sprocket.

With the sprocket assembly having the above construction, one of the chain support projections supports the chain being shifted from the small sprocket to the large sprocket. This allows the chain to be pressed upon the large sprocket without requiting a strong force exerted by a derailleur. Further, the chain is shifted reliably even when a drive load increases to a certain extent during a shifting operation.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Embodiments of the present invention will be described hereinafter with reference to the drawings.

Figure 1:
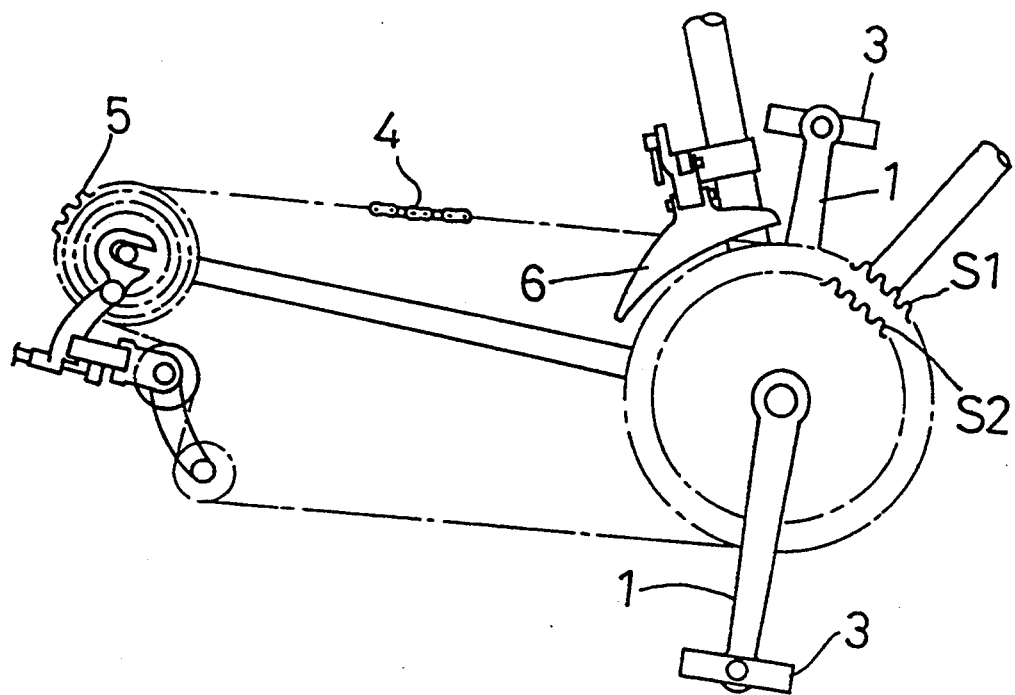
FIG. 1 is a side view of a principal portion of a bicycle having a two-stage sprocket assembly.

FIG. 1 shows a principal portion of a bicycle having a multi-stage change speed apparatus. The drawing shows crank arms 1 pivotally supporting pedals 3, a large sprocket S1, a small sprocket S2, a chain 4, a rear sprocket 5, and a front derailleur 6. As in a conventional drive mechanism of a bicycle, the pedals 3 supported by the crank arms 1 are tuned to drive the sprockets S1 and S2, and the drive is transmitted through the chain 4 to the rear sprocket 5. The derailleur 6 is operable to shift the chain 4 from one front sprocket to the other.

Figure 2:
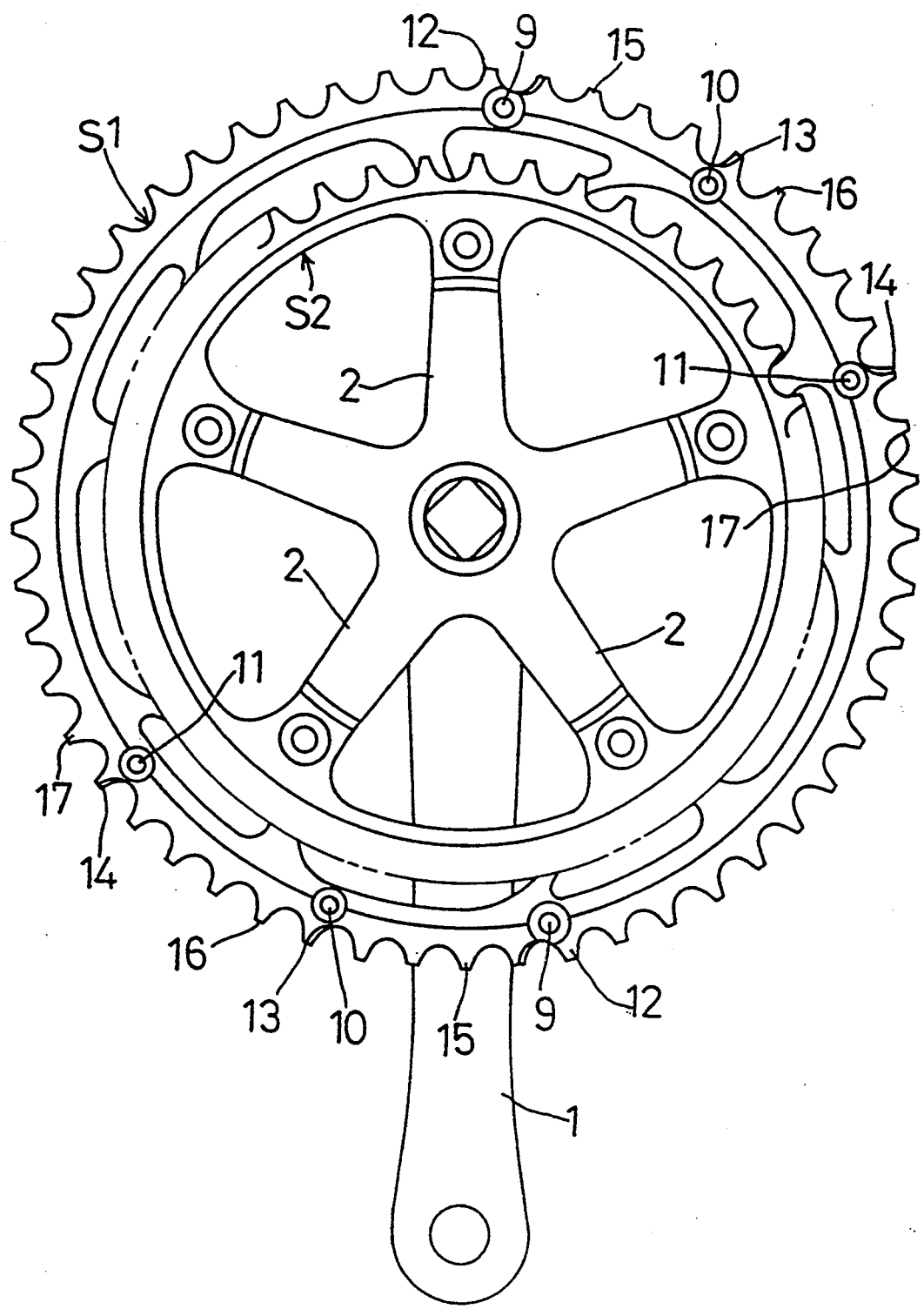
FIG. 2 is a side view of the sprocket assembly having a chain shift aiding mechanism according to the present invention.
Figure 3:
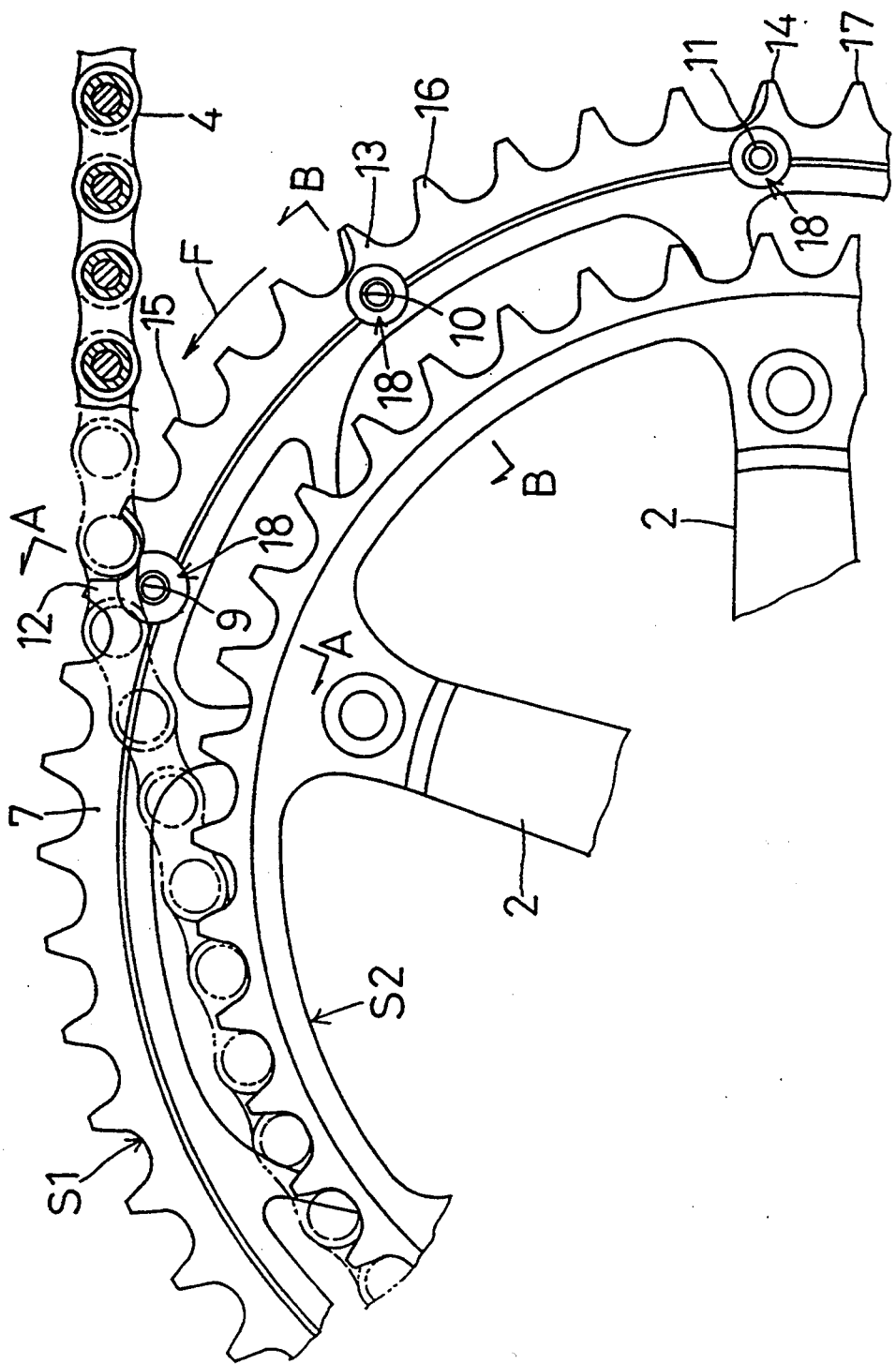
FIG. 3 is an enlarged fragmentary view of a principal portion of the chain shift aiding mechanism shown in FIG. 2.

FIGS. 2 and 3 show a chain shift aiding mechanism provided for the front sprockets. This chain shift aiding mechanism aids in shifting of the chain 4 from the small sprocket S2 to the large sprocket S1. The aiding mechanism includes a plurality of chain support projections 9, 10 and 11 formed on a side surface 7 of the large sprocket S1 opposed to the small sprocket S2. Each of these projections 9, 10 and 11 is in the form of a steel ring attached to the large sprocket S1 through a rivet 8. This structure is shown in detail in FIG. 5.

Figure 4:
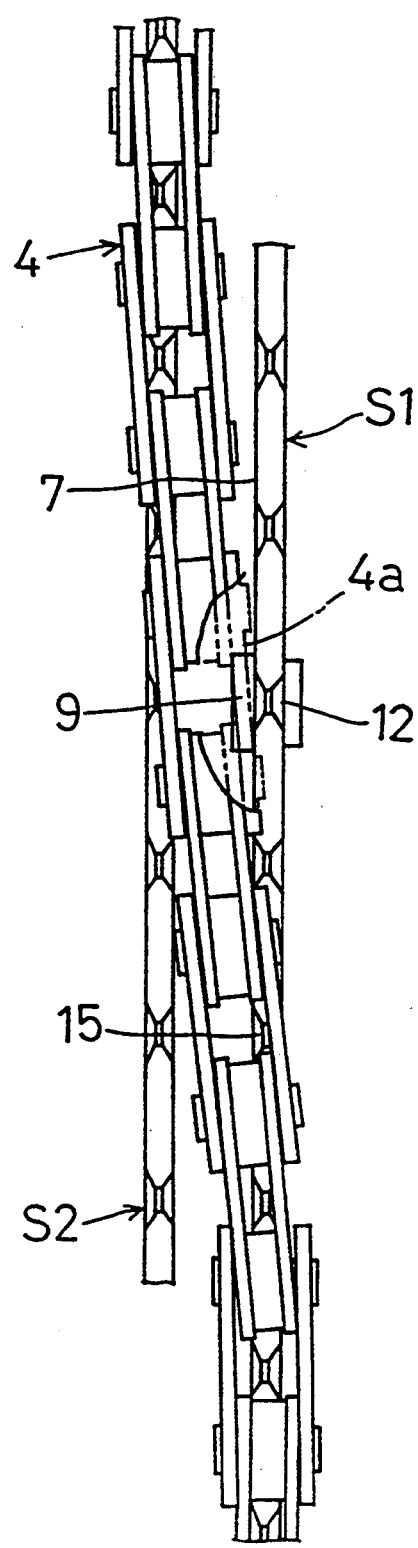
FIG. 4 is an overhead view showing a positional relationship between a chain and the chain shift aiding mechanism shown in FIG. 3.
Figure 5:
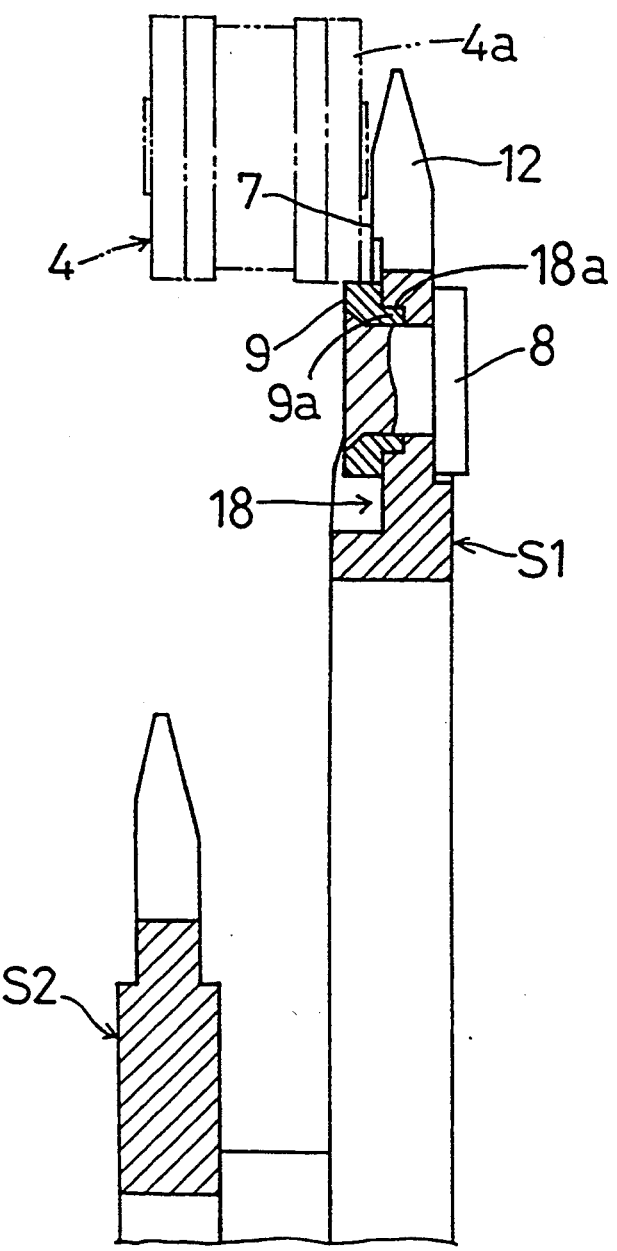
FIG. 5 is a section taken on line A—A of FIG. 3.
Figure 7:
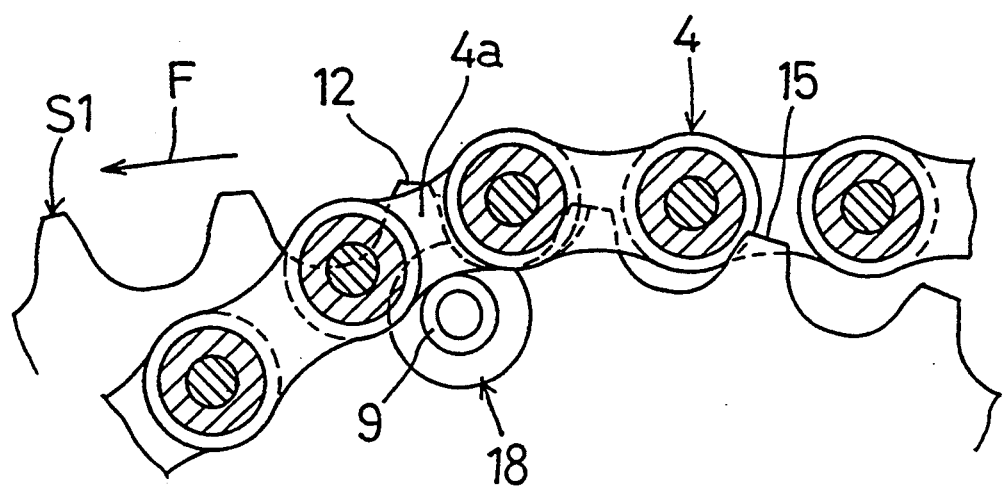
FIG. 7 is a side view showing a positional relationship among the chain shift aiding mechanism, the chain, and sprocket teeth.

As shown in FIGS. 3 through 5, the chain support projections 9, 10 and 11 are formed in proximal regions of chain driving teeth 12–14 of the large sprocket S1 to contact outer link plates 4a of the chain 4 shifted by the derailleur 6 from the small sprocket S2 to the large sprocket S1. As seen from FIG. 5, the chain support projections 9, 10 and 11 are operable only to pick up the chain 4 without meshing with the chain 4.

Positions of the chain support projections 9, 10 and 11 are determined according to a size of the chain 4 and shape of driving teeth 15-17. One of these teeth, e.g. tooth 15, is the tooth that the chain 4 begins to engage when the chain 4 contacts the support projection 9. Similarly, the chain 4 begins to engage the drive tooth 16 upon contact with the support projection 10. Thus, the chain support projections 9, 10 and 11 are displaced from the respective drive teeth 15, 16 and 17 toward a sprocket axis and in a driving direction F shown in FIG. 3.

Each of the chain support projections 9, 10 and 11 arranged in the above positions is operable, with rotation of the large sprocket S1, to pick up the chain 4 shifted by the derailleur 6, and move the chain 4 toward the drive tooth 15, 16 or 17.

Figure 8:
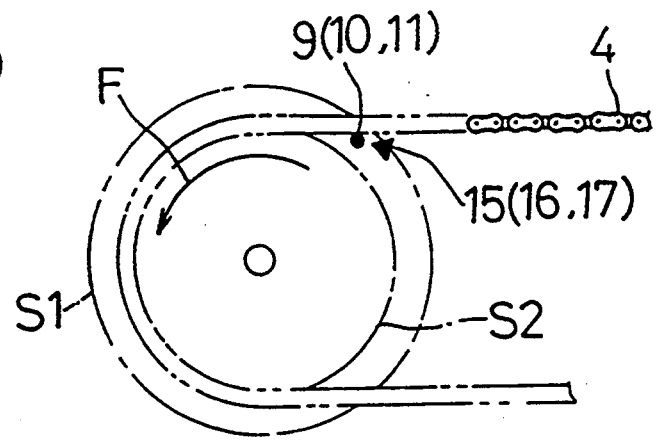
FIGS. 8(a), 8(b) and 8(c) are schematic views showing a way the chain shift aiding mechanism picks up the chain with rotation of the sprocket assembly.
Figure 8:
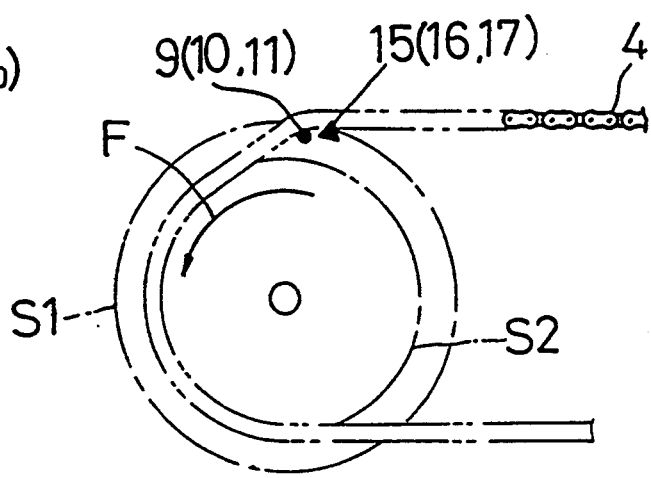
Figure 8:
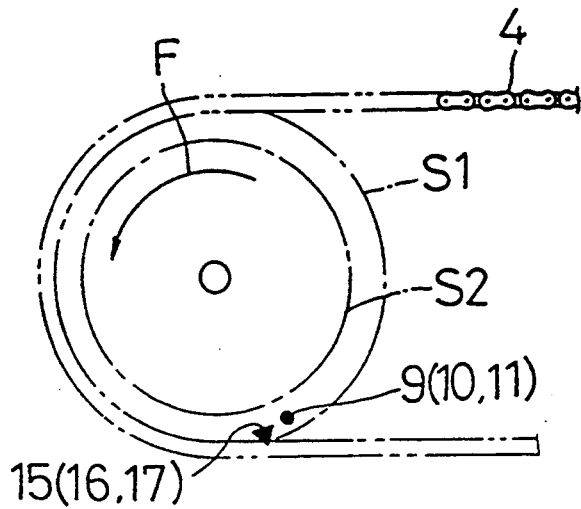

When the sprockets S1 and S2 are rotated with the derailleur 6 operated, one of the chain support projections 9, 10 and 11 revolving with the large sprocket S1 moves to a position under the chain 4 and contacts an outer link plate 4a of the chain 4 as shown in FIG. 8(a).

With further rotation of the large sprocket S 1, as shown in FIG. 8(b), the chain support projection 9, 10 or 11 revolves further to pick up the chain 4 radially outwardly of the large sprocket S1. The chain shift is effected with the chain 4 supported by the chain support projection 9, 10 or 11 even if the derailleur 6 exerts a relatively weak operating force at this time, and even if a chain tension slightly increases with an increase in drive load. If the drive load increases to a great extent, resulting in a substantial increase in the chain tension, the outer link plate 4a falls from the chain support projection 9, 10 or II under the increased chain tension. Thus, the chain 4 is saved from breaking.

With further rotation of the large sprocket S 1, as shown in FIG. 8(c), the shifting force of the derailleur 6 causes the chain 4 to engage one of the drive teeth 15, 16 or 17 and to disengage from the chain support projection 9, 10 or 11. This completes a shift of the chain 4 from the small sprocket S2 to the large sprocket S1.

Figure 6:
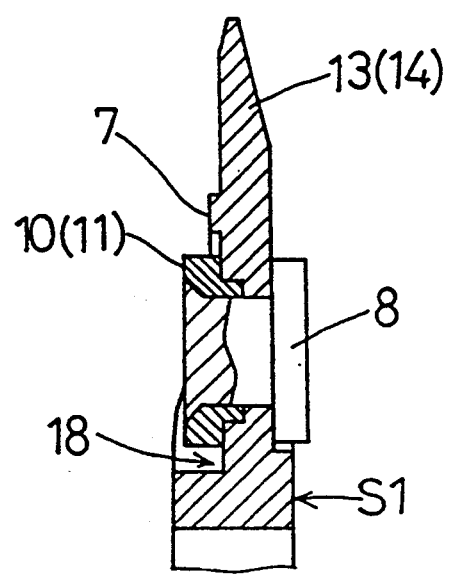
FIG. 6 is a section taken on line B—B of FIG. 3.

As shown in FIGS. 5 and 6, the steel ring forming each of the chain support projections 9, 10 and 11 is fitted in a recess 18 formed in the large sprocket S1. This construction is provided in order that the large sprocket S1 and small sprocket S2 have a small distance therebetween although the chain support projections 9, 10 and 11 project to a large extent. As shown in FIG. 5, the chain support projection 9 has an attaching portion 9a, while the recess 18 has a deeper, stepped recess 18a for engaging the attaching portion 9a. The same structure is provided for the support projections 10 and 11 also.

The steel rings of the chain support projections 9, 10 and 11 are hardened to be resistant to friction with the chain 4.

In the above embodiment, the chain support projections 9, 10 and 11 are formed as components separate from the large sprocket S1. However, these projections may be formed integral with the large sprocket. Where the sprocket S1 is formed of steel, wear-resistant chain support projections may be embossed by press working the sprocket and hardening the embossed projections. The hardening treatment may be omitted, depending on the wear resistance, hardness and other properties of a material used for forming the sprocket.

Figure 9:
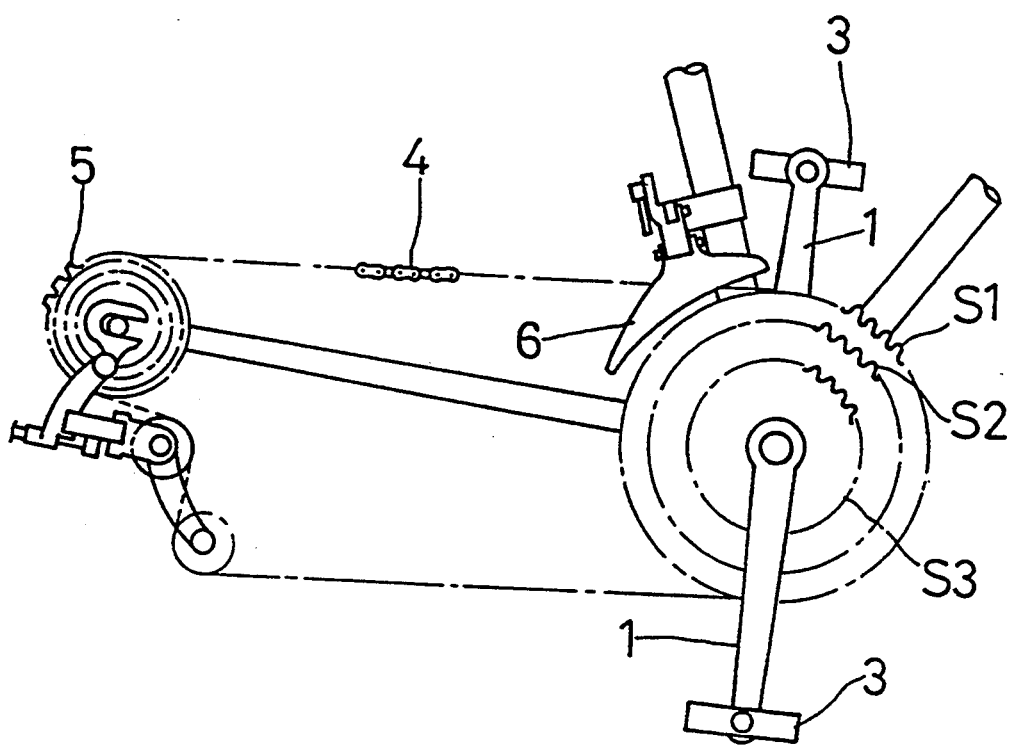
FIG. 9 is a side view of a principal portion of a bicycle having a three-stage sprocket assembly in a further embodiment of the invention.

Another embodiment will be described with reference to FIGS. 9 through 12. FIG. 9 shows a sprocket assembly in this embodiment. This sprocket assembly includes a large sprocket S 1, an intermediate sprocket S2 and a small sprocket S3. As in a conventional drive mechanism of a bicycle, crank arms 1 are turned to transmit drive from the sprockets S1, S2 and S3 through a chain 4 to a rear sprocket 5. A derailleur 6 is operable to provide three speeds by shifting the chain 4 among the sprockets S1, S2 and S3.

A chain shift aiding mechanism in this embodiment will be described next.

This chain shift aiding mechanism includes chain shift teeth 19 and chain support projections 20 formed on a side surface 7 of the large sprocket S1. These elements allow the chain 4 to be shifted from the intermediate sprocket S2 to the large sprocket S1 easily and reliably.

Figure 10:
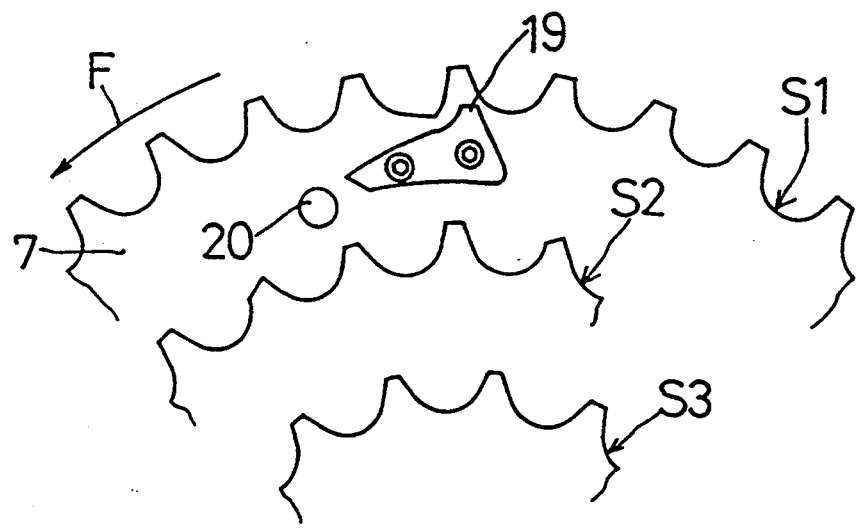
FIG. 10 is a schematic side view of a principal portion of the three-stage sprocket assembly having a chain shift aiding mechanism according to the present invention.
Figure 11:
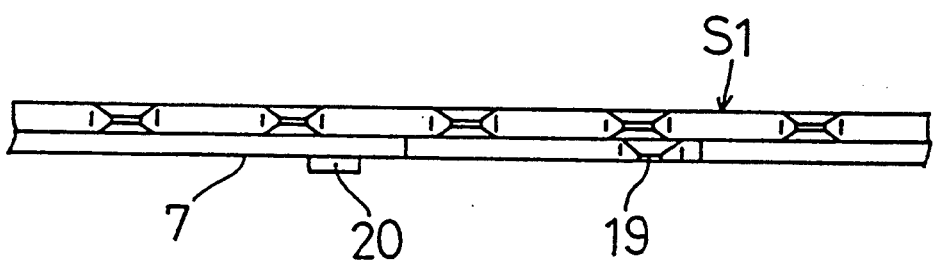
FIG. 11 is an overhead view of the portion shown in FIG. 10, FIGS. 12(a), 12(b), 12(c) and 12(d) are schematic views showing a way the chain shift aiding mechanism picks up the chain with rotation of the sprocket assembly in the further embodiment.

As shown in FIGS. 10 and 11, each chain support projection 20 is in the form of a steel pin attached to the large sprocket S1. The steel pin projects from the side surface of the large sprocket S1 toward the intermediate sprocket S2.

This chain support projection 20 also is operable only to pick up the chain 4 without meshing with the chain 4. Position of the chain support projection 20 is determined according to a size of the chain 4 and a shape of the chain shift tooth 19. In practice, the chain support projection 20 is displaced from the associated chain shift tooth 19 toward an axis of the large sprocket S1 and in a rotating direction F of the sprockets as shown in FIG. 10. The chain support projection 20 positioned as above is operable, with rotation of the large sprocket S1, to pick up the chain 4 shifted by the derailleur 6, and move the chain 4 toward the chain shift tooth 19.

When the sprockets S1 and S2 are rotated with the derailleur 6 operated, the chain support projection 20 revolving with the large sprocket S1 moves to a position under the chain 4 and contacts an outer link plate 4a of the chain 4 as shown in FIG. 12(a).

With further rotation of the large sprocket S1, as shown in FIG. 12(b), the chain support projection 20 revolves further to pick up the chain 4 radially outwardly of the large sprocket S1. The chain shift is effected with the chain 4 supported by the chain support projection 20 even if the derailleur 6 exerts a relatively weak-operating force at this time, and even if a chain tension slightly increases with an increase in drive load.

With further rotation of the large sprocket S1, as shown in FIG. 12(c), the shifting force of the derailleur 6 causes the chain 4 to engage the chain shift tooth 19. Once the chain 4 is meshed with the chain shift tooth 19, the chain 4 is drawn toward the large sprocket S1 by guiding action of the chain shift tooth 19. As a result, the chain 4 engages a tooth of the large sprocket S1. With further rotation of the large sprocket S1, as shown in FIG. 12(d), the chain 4 disengages from the chain shift tooth 19. This completes a shift of the chain 4 from the intermediate sprocket S2 to the large sprocket S1.

Figure 13:
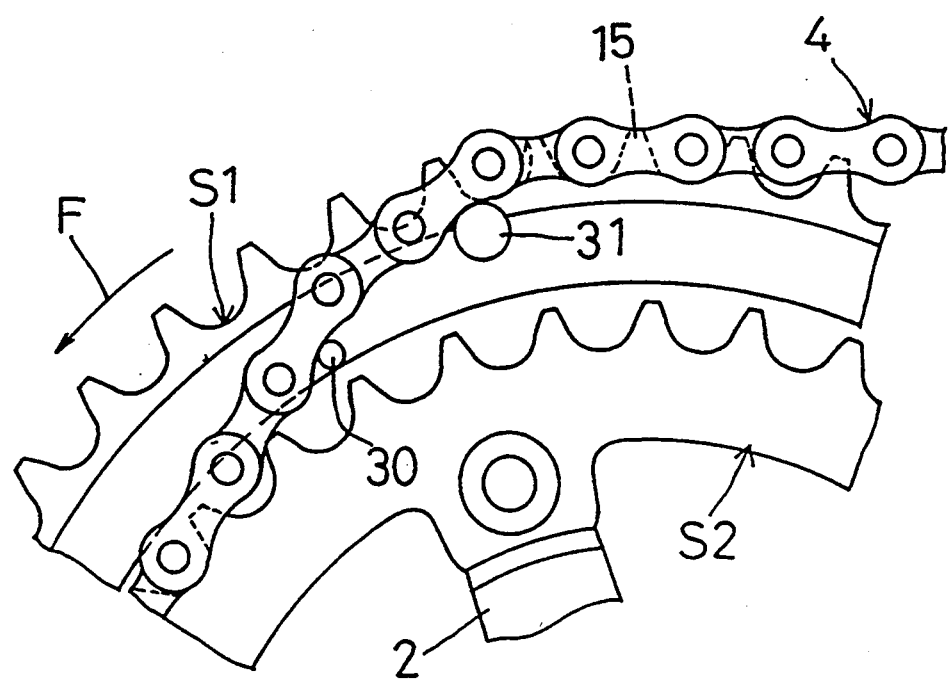
FIG. 13 is a fragmentary side view of a principal portion of a sprocket assembly having a chain shift aiding mechanism in a still further embodiment of the invention.
Figure 14:
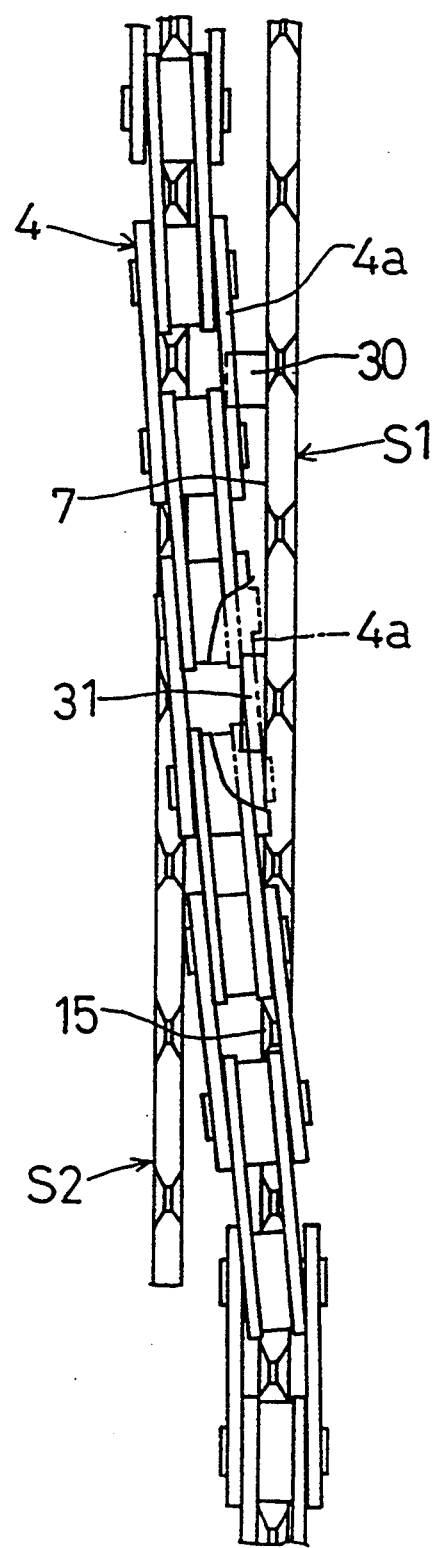
FIG. 14 is an overhead view of the portion shown in FIG. 13.

FIGS. 13 and 14 show a further embodiment. In the illustrated three-stage sprocket assembly, a large sprocket S1 includes a first chain support projection 30 and a second chain support projection 31 formed on a side surface 7 thereof opposed to an intermediate sprocket S2. These projections 30 and 31 allow the chain 4 to be shifted from the intermediate sprocket S2 to the large sprocket S1 easily and reliably.

Specifically, the chain support projections 30 and 31 are in the form of steel pins projecting from the large sprocket S1.

Position of the first chain support projection 30 is determined according to a size and shape of the chain 4. As seen from FIG. 13, the first chain support projection 30 is displaced from the second chain support projection 31 toward a sprocket axis and in a rotating direction F of the sprockets as shown in FIG. 13.

When the sprockets S1 and S2 are rotated with the derailleur 6 operated, the first chain support projection 30 revolving with the large sprocket S1 moves to a position under the chain 4 and contacts an outer link plate 4a of the chain 4.

With further rotation of the large sprocket S1, the first chain support projection 30 revolves further to pick up the chain 4 radially outwardly of the large sprocket S1. At this time, the second chain support projection 31 moves under and engages the raised chain 4 without meshing with the chain 4. By the raising action of the chain support projections 30 and 31 and the shifting action of the derailleur 6, the chain 4 is meshed with a drive tooth 15 (FIG. 13) of the large sprocket S1 which contacts the chain 4 before any other teeth. In this way, the chain 4 is shifted from the intermediate sprocket S2 to the large sprocket S1 easily and reliably.

The second chain support projection 31 also is disposed in a position determined according to the size and shape of the chain 4. The second chain support projection 31 is displaced from the drive tooth 15 radially toward the axis of the large sprocket S1 and in the rotating direction F of the sprockets shown in FIG. 13.

Figure 15:
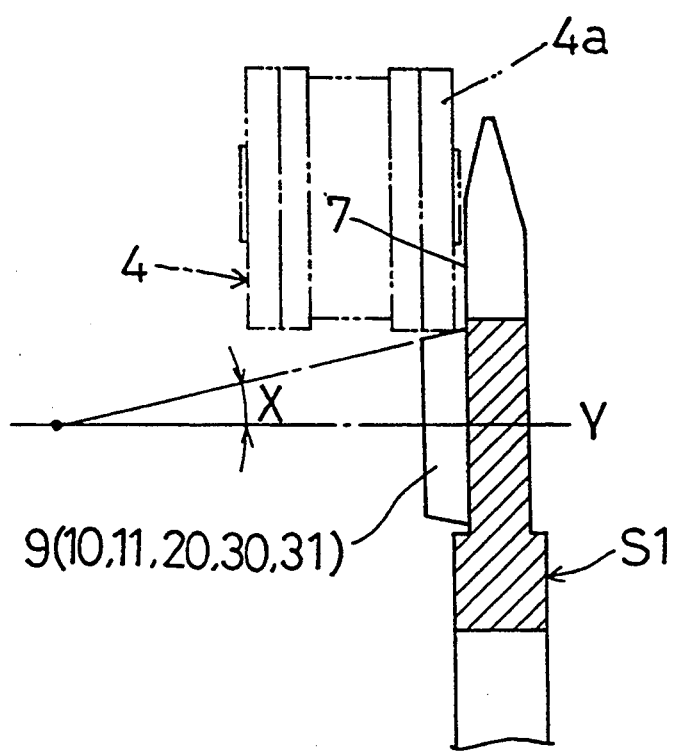
FIG. 15 is a fragmentary view showing a modified chain shift aiding mechanism with an inclined surface for contacting the chain.

In all of the foregoing embodiments, each chain support projection 9, 10, 11, 20, 30 or 31 may include a surface for contacting an outer link plate 4a of the chain 4, which surface has a suitable angle of inclination "x" as shown in FIG. 15. This angle may be determined to adjust a chain tension for causing the chain 4 to fall off the chain support projection. In FIG. 15, the angle "x" represents an inclination, with respect to an axis Y of the projection, of the surface of the chain support projection for engaging the chain 4.

Where, as in all of the described embodiments, a plurality of chain support projections and a plurality of chain shift teeth are provided, a shifting operation is carded out quickly with increased chances of the chain 4 engaging a chain support projection and chain shift tooth in the course of rotation of the sprockets. Nevertheless, only one chain support projection or chain shift tooth may be provided.

The chain support projections and chain shift teeth may be provided on the intermediate sprocket only or on both the large sprocket and intermediate sprocket.

What is claimed is:

1. A sprocket assembly for a bicycle comprising:
   a large sprocket;
   a small sprocket; and
   chain support means projecting from a side surface of said large sprocket toward said small sprocket, and including a contact portion defining a contact surface for contacting, without meshing, a lower end of a chain shifted from said small sprocket to said large sprocket;
   wherein said chain support means is disposed for causing said contact surface to contact said chain engaging said small sprocket and pick up said chain radially outwardly of said large sprocket during a chain shift from said small sprocket to said large sprocket, and wherein said contact surface is arched upwardly relative to the bicycle.

2. A sprocket assembly for a bicycle comprising:
   a large sprocket;
   a small sprocket; and
   chain support means projecting from a side surface of said large sprocket toward said sprocket, and including a contact portion defining a contact surface for contacting, without meshing, a lower end of a chain shifted from said small sprocket to said large sprocket;
   wherein said chain support means is disposed for causing said contact surface to contact said chain engaging said small sprocket and pick up said chain radially outwardly of said large sprocket during a chain shift from said small sprocket to said large sprocket, and wherein said contact portion is in the form of a ring having an axis extending parallel to an axis of said large and small sprockets.

3. A sprocket assembly for a bicycle comprising:
   a large sprocket;
   a small sprocket; and
   chain support means projecting from a side surface of said large sprocket toward said small sprocket, and including a contact portion defining a contact surface for contacting, without meshing, a lower end of a chain shifted from said small sprocket to said large sprocket;
   wherein said chain support means is disposed for causing said contact surface to contact said chain engaging said small sprocket and pick up said chain radially outwardly of said large sprocket during a chain shift from said small sprocket to said large sprocket and wherein said chain support means further includes a pin projecting from said side surface of said large sprocket toward said small sprocket, said pin being displaced from said contact portion toward a center of rotation of said large sprocket and in a rotating direction of said large sprocket.

4. A sprocket assembly for a bicycle comprising:
   a large sprocket;
   a small sprocket; and
   chain support means projecting from a side surface of said large sprocket toward said small sprocket, and including a contact portion defining a contact surface for contacting, without meshing, a lower end of a chain shifted from said small sprocket to said large sprocket;
   wherein said chain support means is disposed for causing said contact surface to contact said chain engaging said small sprocket and pick up said chain radially outwardly of said large sprocket during a chain shift from said small sprocket to said large sprocket, and wherein said contact portion is hardened for increased wear resistance.

5. A sprocket assembly for a bicycle comprising:
   a large sprocket;
   a small sprocket; and
   chain support means projecting from a side surface of said large sprocket toward said small sprocket, and including a contact portion defining a contact surface for contacting, without meshing, a lower end of a chain shifted from said small sprocket to said large sprocket;
   wherein said chain support means has a circular projection viewed in a direction perpendicular to said large sprocket, and wherein said chain support means is disposed for causing said contact surface to contact said chain engaging said small sprocket and pick up said chain radially outwardly of said large sprocket during a chain shift from said small sprocket to said large sprocket.

6. A sprocket assembly as defined in claim 5, wherein said projection is formed integral with said large sprocket.

7. A sprocket assembly as defined in claim 6, wherein said projection is embossed by press working said large sprocket.

8. A sprocket assembly as defined in claim 6, wherein a distance from said chain support means to a last tooth, of said small sprocket, engaged by said chain and a distance from said chain support means to a first tooth that engages with said chain are integral multiples of a chain pitch.

9. A sprocket assembly for a bicycle comprising:
a large sprocket;
a small sprocket;
chain support means projecting from a side surface of said large sprocket toward said small sprocket, and including a contact portion defining a contact surface for contacting, without meshing, a lower end of a chain shifted from said small sprocket to said large sprocket;
wherein said chain support means has a portion with an arched cross-section, and wherein said chain support means is disposed for causing said contact surface to contact said chain engaging said small sprocket and pick up said chain radially outwardly of said large sprocket during a chain shift from said small sprocket to said large sprocket.

10. A sprocket assembly as defined in claim 9, wherein said projection is formed integral with said large sprocket.

11. A sprocket assembly as defined in claim 10, wherein said projection is embossed by press working said large sprocket.

12. A sprocket assembly as defined in claim 9, wherein a distance from said chain support means to a last tooth, of said small sprocket, engaged by said chain and a distance from said chain support means to a first tooth that engages with said chain are integral multiples of a chain pitch.

* * * * *